(No Model.)
F. H. BUZZACOTT.
COOKING OUTFIT.
No. 577,642.  Patented Feb. 23, 1897.
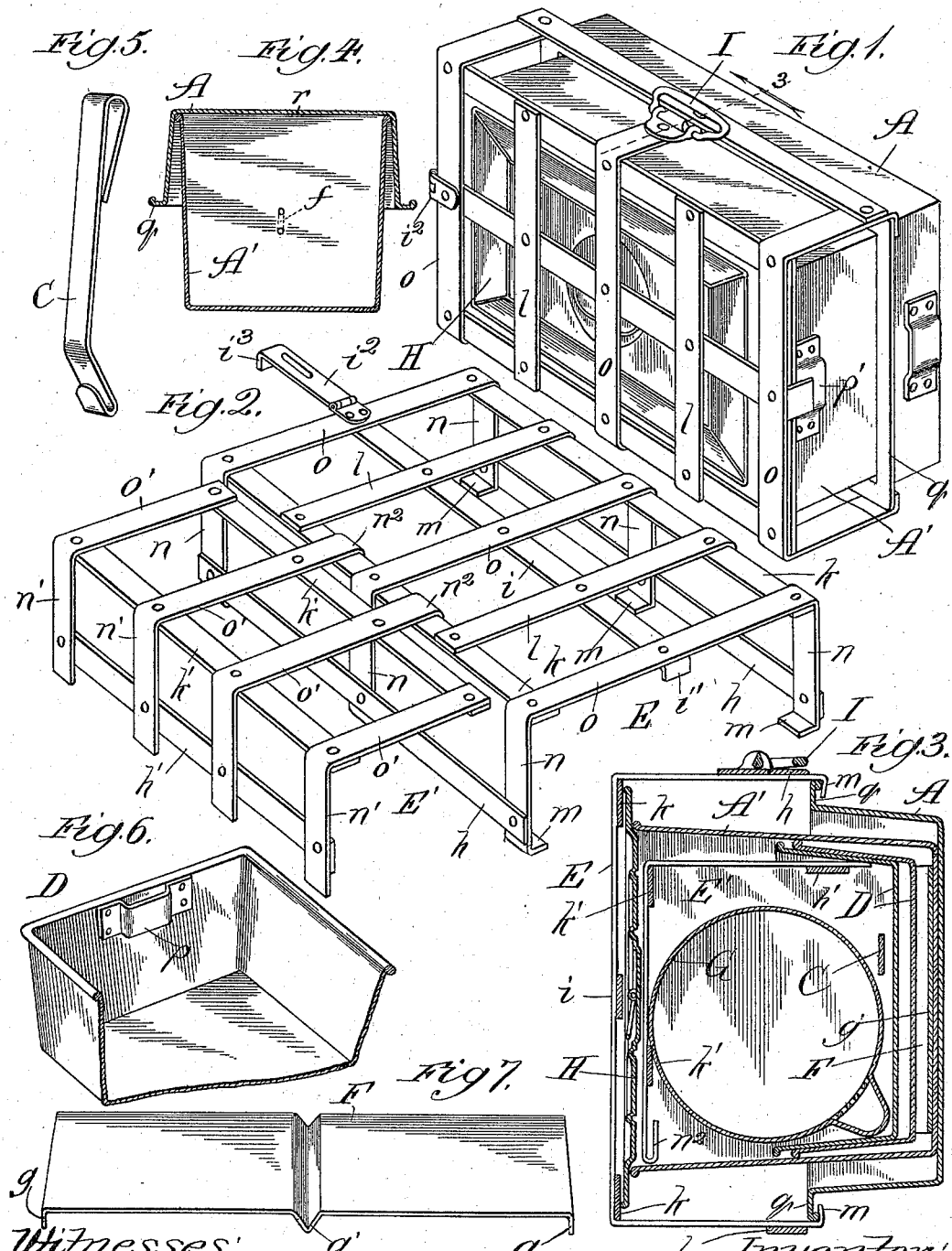

UNITED STATES PATENT OFFICE.

FRANCIS H. BUZZACOTT, OF CHICAGO, ILLINOIS.

COOKING OUTFIT.

SPECIFICATION forming part of Letters Patent No. 577,642, dated February 23, 1897.

Application filed March 12, 1896. Serial No. 582,963. (No model.)

*To all whom it may concern:*

Be it known that I, FRANCIS H. BUZZACOTT, a citizen of the United States, residing at Chicago, in the county of Cook and State of Illinois, have invented a new and useful Improvement in Cooking Outfits, of which the following is a specification.

My invention relates to an improvement in the class of portable cooking outfits for camp use in which the various pans, pots, and other cooking utensils are adapted, for convenience in transportation, to be compactly stowed away in a case composed of pans adapted to be adjusted together to afford the baking or roasting oven feature of the outfit and to be nested for confinement in the skeleton stove or grating by which to carry the outfit.

My present improvement relates to details of the construction of camp cooking outfit set forth in Letters Patent of the United States No. 549,056, granted to me October 29, 1895.

In the accompanying drawings, Figure 1 is a perspective view of the improved outfit when packed ready for transportation; Fig. 2, a perspective view of my improved construction of the skeleton stove or grating in condition for use; Fig. 3, a section taken at the line 3 on Fig. 1 and viewed in the direction of the arrow to illustrate how the various utensils may be compactly stowed away in the casing; Fig. 4, a cross-sectional view of the casing forming the oven; Fig. 5, a perspective view of the lifter by means of which to handle the utensils when hot; Fig. 6, a broken perspective view of one of the pans, showing a loop at which to apply the lifter on the inner surface of one of its sides; and Fig. 7, a perspective view of a false bottom for the oven.

A and A' are pans, the former being the wider and shallower of the two, to fit, in inverted position, over the top of the latter, upon which it then rests at its base $r$, while the edge of the pan A about its flaring open top is flanged, as shown at $q$, for a purpose hereinafter described, and extends about midway between the top and base of the pan A'.

When the pans A and A' are adjusted in the relative positions in which they are illustrated in Fig. 4, they afford an oven for baking or roasting, which, owing to the overlapping of one pan by the other, insures its being airtight under all conditions in which it may be used. These pans are adapted to be nested for compact packing by placing the smaller and deeper one A' into the larger and shallower one A, and they should be provided at one or both ends, as should also the various other pans and pots, with loops $p'$ on their outer sides, into which to hook a lifter C, adapted to form a handle by which to manipulate the various utensils when hot.

A pan is shown at D in Fig. 6 provided with a lifting-loop $p$ on the inner surface of one of its sides for application of the lifter C. The provision of the loop on the inner side of a pan-like utensil is advantageous, since it enables the application of the lifter for its purpose from the inner portion of the utensil, at which, when the utensil is packed away or in the oven or other housing, the loop is much more conveniently accessible than when provided on the outer side.

E is the skeleton stove or grating, comprising a top and sides extending therefrom and formed of the transverse U-shaped bars $o$, the parallel sections $n$ of which afford the legs and are bent inward at their extremities to form catches $m$, the intermediate transverse bars $l$, the longitudinal corner-bars $k$ $k$, and intermediate longitudinal bar $i$, having the clip $i'$ at one end and the hinged leg $i^2$, terminating in an inward-extending catch $i^3$, and the longitudinal side bars $h$, connecting the legs $n$.

E' is a supplemental grating to form an extension of the grating E, and comprising the transverse angle-bars $o'$, affording legs $n'$, and the intermediate ones of which are extended and provided at their extremities with hooks $n^2$, and the longitudinal connecting-bars $k'$ $k'$ and $h'$. The supplemental grating thus forms two sides of a rectangle of dimensions adapting it to fit inside the pan A'.

F is a false bottom for use in the oven to prevent burning of the material being cooked therein and is composed of a sheet of metal bent at its opposite ends to form the legs $g$ $g$ and across its central portion to form the leg $g'$, the legs serving to afford an air-space between the false bottom and bottom of the oven.

To employ my improved outfit for cooking in camp, the grating forms an elevated support, (under which the fire is built, on the ground,) affording a skeleton stove for sustaining the utensils, such as a coffee-pot G, the pan D, and other utensils used in cooking food and heating water, and it also forms a broiler. The extension E' is applied to the grating E in the manner illustrated by hooking it at its hooks $n^2$ over either side bar $k$ to widen the stove or over either end bar $o$ to lengthen it. In either position of its adjustment it materially increases the service area of the stove, and it may be readily adjusted in position and as readily disconnected.

Either pan A or A' of the oven may be used as a boiler for heating water or cooking or for a dish-pan, or it may be used as a heating-stove for a tent by covering with it a bed of live coals, which may be placed in a pit dug in the ground, and packing earth around the edges of the inverted pan to tightly seal the fire, which latter, being thus kept in an air-tight inclosure, will heat the pan, from which a gentle heat will radiate through the night without smoke or gas, without danger, or requiring any attention whatever.

To cook in the oven formed with the pans A and A', it may be placed on the skeleton stove over the fire under it or directly on live coals on the ground, and coals or hot ashes may also be placed on the top of the oven, or a small fire may be built thereon.

To pack the parts of my improved outfit, the pan A' is nested in the pan A, and all the smaller utensils, including pans D, the coffee-pot G, and the lifter E, are laid inside the pan A', into which also the supplemental grating E' is introduced to extend with one side across the top of the pan, over which is placed a cover H, which may be used as a cover for a pan in cooking therein. Then the rectangular grating E is slipped lengthwise over the whole, whereby the catches $m$ come under the flange $q$ of the pan A, and the grating E is thus fastened to the outer pan and forms part of the kit of utensils, by which the outfit may be conveniently carried at a handle I hinged for the purpose to a middle leg $n$. The stop $i'$ confines the nested utensils at one end of the grating against longitudinal displacement thereat, and by turning down the hinged leg $i^2$ at the opposite end to introduce its catch $i^3$ underneath the flange $q$ the nested utensils are securely fastened in place lengthwise of the kit. The proportions are such that the catches $m$ and $i'$ wedge with sufficient tightness under the flange $q$ to hold all the parts tightly together, and if it be desired to lock the grating in place the hinged leg $i^2$ may be constructed as a hasp, as indicated, to fit over a staple $f$ in proper position on the flange $q$, and in which to hang a padlock. (Not shown.) Moreover, the grating E, the bars forming which are preferably of steel, forms, when thus secured about the pans and sheet-metal utensils within, a strong protecting-cage against accidental damage, as by indentation, to the ware.

What I claim as new, and desire to secure by Letters Patent, is—

1. The combination with a pan, of a metal grating having a top and sides extending therefrom to embrace said pan, and forming a skeleton stove and also a protective cage for the pan and such other utensils as may be contained therein, means on the stove and pan for securing them in this relation, and a supplemental grating provided with means for connecting it with said grating to extend the service area of the stove, substantially as described.

2. The combination with a pan, of a metal grating having a top and sides extending therefrom to embrace said pan and forming a skeleton stove and also a protective cage for the pan and such other utensils as may be contained therein, means on the stove and pan for securing them in this relation, and a supplemental grating affording an extension of said stove and forming two sides of a rectangle composed of transverse angle-bars $o'$, having hook extensions $n^2$ at which to engage a bar of said stove, and longitudinal bars $k'$ and $h'$, said supplemental grating being adapted to nest in said pan, substantially as described.

3. A camp cooking outfit comprising, in combination, a pan A having a flange $q$, a pan A' nesting in said pan A, a cover H over said pan A', and a metal grating E formed with legs $n$ having the inwardly-projecting catches $m$, a stop-lug $i'$ at one end of the grating and a hinged catch at the opposite end thereof, said grating E extending over the covered pan A' and engaging at its said catches and lug the flange $q$ about the pan A, the whole being constructed and arranged to be operated substantially as and for the purpose set forth.

FRANCIS H. BUZZACOTT.

In presence of—
 M. J. FROST,
 J. H. LEE.